(12) United States Patent
Matsuzaki

(10) Patent No.: US 8,432,771 B2
(45) Date of Patent: *Apr. 30, 2013

(54) ELECTRONIC TIMEPIECE

(75) Inventor: Jun Matsuzaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 290 days.

This patent is subject to a terminal disclaimer.

(21) Appl. No.: 12/852,669

(22) Filed: Aug. 9, 2010

(65) Prior Publication Data

US 2011/0044137 A1    Feb. 24, 2011

(30) Foreign Application Priority Data

Aug. 18, 2009 (JP) ................................. 2009-189143

(51) Int. Cl.
    *G04C 11/02* (2006.01)
(52) U.S. Cl.
    USPC ............................................................ 368/47
(58) Field of Classification Search .................... 368/46, 368/47, 10, 14; 342/357.06, 357.15; 375/354
    See application file for complete search history.

(56) References Cited

U.S. PATENT DOCUMENTS

| | | | |
|---|---|---|---|
| 6,212,133 B1 | 4/2001 | McCoy et al. | |
| 6,650,288 B1 | 11/2003 | Pitt et al. | |
| 7,148,844 B2 * | 12/2006 | Salkhi | 342/357.62 |
| 7,317,418 B2 * | 1/2008 | Salkhi | 342/357.62 |
| 7,436,357 B2 | 10/2008 | Wang et al. | |
| 7,457,203 B2 | 11/2008 | Nakagawa | |
| 7,570,208 B2 | 8/2009 | Wang et al. | |
| 7,623,067 B2 | 11/2009 | Raman et al. | |
| 8,116,170 B2 * | 2/2012 | Matsuzaki | 368/47 |
| 2006/0114151 A1 | 6/2006 | Iwami | |
| 2006/0214847 A1 | 9/2006 | McBurney et al. | |
| 2007/0210957 A1 | 9/2007 | Brodie et al. | |
| 2007/0241959 A1 | 10/2007 | Nakagawa | |
| 2008/0025151 A1 * | 1/2008 | Urano et al. | 368/14 |
| 2008/0030403 A1 * | 2/2008 | Honda et al. | 342/357.01 |
| 2008/0175105 A1 | 7/2008 | Urano et al. | |
| 2009/0034371 A1 | 2/2009 | Matsuzaki | |
| 2009/0034372 A1 * | 2/2009 | Fujisawa | 368/14 |
| 2009/0160705 A1 | 6/2009 | Matsuzaki | |
| 2012/0170425 A1 | 7/2012 | Matsuzaki | |

FOREIGN PATENT DOCUMENTS

| | | |
|---|---|---|
| EP | 0451607 A2 | 10/1991 |
| EP | 1287375 B1 | 4/2007 |
| EP | 1884753 A1 | 2/2008 |
| EP | 2063329 A1 | 5/2009 |
| EP | 2073081 A1 | 6/2009 |
| JP | 10-010251 | 1/1998 |
| JP | 2003-149315 | 5/2003 |

\* cited by examiner

*Primary Examiner* — Edwin A. Leon

(57) ABSTRACT

An electronic timepiece has a reception unit that executes a search process to search for satellite signals that can be captured from among satellite signals transmitted from a plurality of positioning information satellites, and from among the satellite signals captured by the search process receives a satellite signal with signal strength greater than or equal to a specific signal reception threshold value; an information acquisition unit that acquires specific information including at least time information based on a satellite signal received by the reception unit; and a display that displays acquired information. A threshold value changing unit lowers the signal reception threshold value according to a search count, which is the number of times the search process has been applied to the satellite signals of all positioning information satellites.

6 Claims, 11 Drawing Sheets

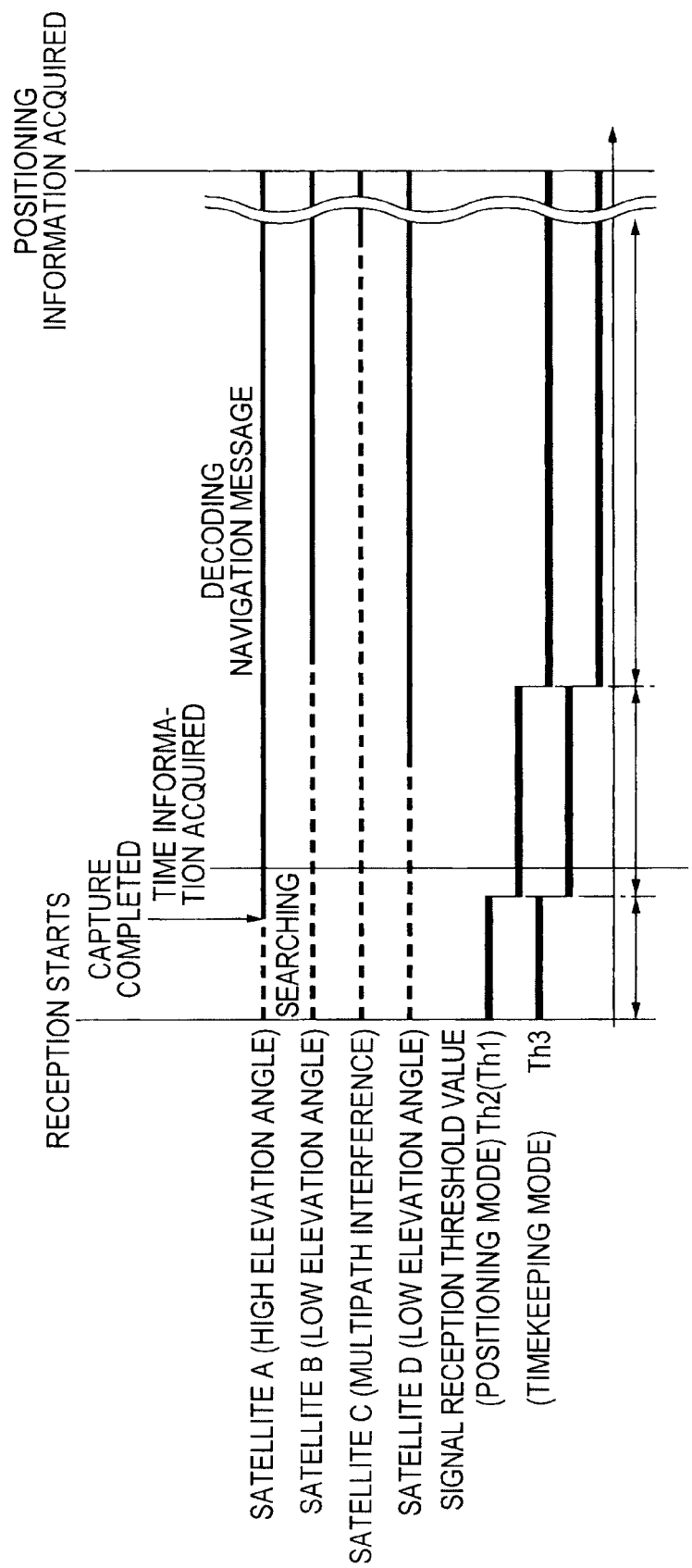

MAIN FRAME STRUCTURE

Telemetry word TLM

HandOver Word HOW

ELECTRONIC TIMEPIECE

CROSS-REFERENCE TO RELATED APPLICATIONS

Japanese Patent Application No. 2009-189143, filed Aug. 18, 2009, is hereby incorporated by reference in its entirety.

BACKGROUND

1. Field of Invention

The present invention relates to an electronic timepiece that receives satellite signals and obtains date and time information from GPS satellites or other positioning information satellites.

2. Description of Related Art

The Global Positioning System (GPS), which is a system for determining one's location, uses GPS satellites that orbit the Earth on known orbits, and enables devices to determine the current location of a GPS receiver by receiving signals from the GPS satellites.

To capture satellite signals transmitted from the GPS satellites, threshold values are assigned to correlation and signal strength values, and satellite signals with a signal level exceeding the threshold value are received to determine if subsequent periodic processes and navigation data decoding processes can be executed. This enables receiving high quality radio signals with low noise, and enables improving positioning precision and correcting the time and date accurately. See, for example, Japanese Unexamined Patent Appl. Pub. JP-A-2003-149315.

When the GPS receiver taught in JP-A-2003-149315 receives a satellite signal from a satellite at a high elevation angle, the signal level of the signal received from that satellite is stored in memory, and when the number of data values stored in memory exceeds a specific number, the data average (average movement) is calculated. This GPS receiver uses a method of eliminating satellite signals from satellites at a low elevation angle and eliminating multipath interference by referencing a data table correlating optimum threshold values to received signal levels, and setting an optimum threshold value for the average movement.

This GPS receiver acquires and stores almanac data in local memory. Based on the almanac data stored in memory, the GPS receiver can identify the GPS satellites located at a high elevation angle and receive satellite signals from the identified GPS satellites, which is particularly useful for so-called warm-start reception processes.

However, this GPS receiver sets a threshold value for receiving satellite signals from GPS satellites located at a high elevation angle based on the almanac data regardless of the reception environment, and receives satellite signals with signal strength equal to or exceeding the threshold value. As a result, when the reception environment is poor, such as when the GPS receiver is located indoors, the GPS receiver taught in JP-A-2003-149315 cannot capture satellite signals from GPS satellite located at a high elevation angle and therefore cannot receive signals.

A further problem in small electronic timepieces such as wristwatches is that providing storage capacity sufficient to store the almanac data is difficult. In addition, acquiring the almanac data requires a lengthy reception process, and because the power supply is limited in such small electronic timepieces, such lengthy reception processes are not desirable because of their power consumption.

Such small electronic timepieces therefore use a correlation process to identify the transmission source of the satellite signal by applying a pseudonoise code (PN code) to determine from which unknown positioning information satellite the received signal was transmitted. If the signal strength of the satellite signal identified by this correlation process is greater than or equal to a specified signal reception threshold value, the satellite signal is captured and received. In other words, such small electronic timepieces require a so-called cold-start reception process. A problem with this configuration is that if a high signal reception threshold value appropriate to satellites at a high elevation angle is set in this cold-start satellite signal reception process and the reception environment is poor, the time from the start of the signal correlation process until the satellite signal is captured is long, and power consumption therefore increases.

SUMMARY OF INVENTION

An electronic timepiece according to the present invention can receive satellite signals appropriately to the reception environment with low power consumption.

A first aspect of the invention is an electronic timepiece including a reception unit that executes a search process to search for satellite signals that can be captured from among satellite signals transmitted from a plurality of positioning information satellites, and from among the satellite signals captured by the search process receives a satellite signal with signal strength greater than or equal to a specific signal reception threshold value; an information acquisition unit that acquires specific information including at least time information based on a satellite signal received by the reception unit; a display that displays acquired information; a threshold value changing unit that lowers the signal reception threshold value according to a search count, which is the number of times the search process has been applied to the satellite signals of all positioning information satellites; a reception environment detection unit that detects the reception environment of the satellite signal; and an initial threshold value setting unit that sets the initial value of the signal reception threshold value according to the reception environment detected by the reception environment detection unit.

When the search process (correlation process) is applied to the satellite signals from all positioning information satellites, the time required for the correlation process (required correlation time) is substantially constant. As a result, the threshold value changing unit may alternatively run a process that tracks the correlation count and reduces the signal reception threshold value when the correlation count reaches a specific number, or a process that measures the required correlation time and reduces the signal reception threshold value whenever the time required to execute the correlation process a specified number of times passes.

In this aspect of the invention the reception environment detection unit detects the state of the reception environment, and the initial threshold value setting unit sets the initial signal reception threshold value according to the reception environment.

For example, the reception environment deteriorates when the electronic timepiece is indoors or the wrist on which the electronic timepiece is worn is moving, and receiving satellite signals with high signal strength transmitted from positioning information satellites at a high elevation angle is difficult. Satellite signals with low signal strength can be received in such a reception environment, but when the signal reception threshold value is set high as described above, a long time is required until satellite signals with such low signal strength can be captured.

When the reception environment is thus poor, the electronic timepiece according to the invention sets the initial signal reception threshold value to a low value by using the initial threshold value setting unit, and the reception unit receives satellite signals with signal strength greater than or equal to the set signal reception threshold value. As a result, satellite signals with low signal strength can be received sooner than when the reception process is executed based on a preset high signal reception threshold value. The information acquisition process of the information acquisition unit, that is, the satellite signal decoding process, can therefore also be executed sooner. By thus completing the satellite signal reception process and the information acquisition process sooner, the power consumption required for these processes can be suppressed, and the battery voltage can be made to last for a long time. In addition, because the drop in battery power can be suppressed, system shutdowns due to a voltage drop can be prevented.

In an electronic timepiece according to another aspect of the invention, the reception unit stops the reception operation when the signal reception threshold value is set to a specific minimum by the threshold value changing unit, and the satellite signal cannot be captured within the specific correlation count after the signal reception threshold value is set to the minimum.

The invention does not receive satellite signals when the signal reception threshold value is set to a specific minimum value by the threshold value changing unit and a positioning information satellite is then not captured within a specific number of correlations. More specifically, if satellite signals are reaching the electronic timepiece but the signal strength of the satellite signals is below a minimum setting, the signals also contain much noise, acquiring accurate information is difficult, and executing the timekeeping process or positioning process with good precision is difficult. By not capturing the satellite signal and stopping the reception process in such situations, the problem of displaying incorrect information on the display unit can be prevented.

An electronic timepiece according to another aspect of the invention preferably also has a solar cell that receives light and produces electric power, and the reception environment detection unit detects the reception environment based on power output from the solar cell.

This aspect of the invention detects the reception environment based on the power output of the solar cell. More specifically, when the power output of the solar cell is great, it can be determined that the electronic timepiece is located outdoors where sunlight can be received, placed in a position where there is no obstruction in the high elevation angle direction, and reception sensitivity is good. However, when the power output of the solar cell is low, it can be determined that power is produced only from weak indoor lighting, the electronic timepiece is placed in a position where there is an obstruction in the high elevation angle direction, and the reception environment is poor. The reception environment can therefore be easily detected with a simple configuration that uses the power output of a solar cell. Power consumption can also be compensated for by providing a solar cell in a small electronic timepiece.

In an electronic timepiece according to another aspect of the invention, the reception environment detection unit is a vibration detection unit that detects vibration of the electronic timepiece, and detects the reception environment based on the amount of vibration detected.

A gyroscopic sensor that detects the amount of vibration from the acceleration or tilting of the electronic timepiece, for example, can be used as the vibration detection unit, or the amount of vibration can be detected based on the amount of power generated in an electronic timepiece with a power generating function that generates power by causing a rotary pendulum to rotate when the wrist swings.

A wristwatch type electronic timepiece is generally used worn on the user's wrist, and because the arms are positioned on the right and left sides of the body, the amount of vibration can be detected by a signal detection unit when the user is walking. Because the electronic timepiece also moves in conjunction with movement of the user when the user is walking, the reception environment changes accordingly, and the reception environment may deteriorate such as when satellite signals are blocked by a building.

When the detected amount of vibration is greater than or equal to a specific threshold value in this situation, this aspect of the invention can determine that the user is walking and the reception environment may deteriorate.

An electronic timepiece according to another aspect of the invention further preferably has a mode changing unit that changes to a timekeeping mode for acquiring the time information using the information acquisition unit, or a positioning mode that acquires the positioning information contained in the satellite signal using the information acquisition unit and calculates the position of the electronic timepiece. When the positioning mode is selected by the mode changing unit, the initial threshold value setting unit sets the initial value of the signal reception threshold value according to the reception environment detected by the reception environment detection unit to a specific first signal reception threshold value for positioning, or to a second signal reception threshold value for positioning that is lower than the first signal reception threshold value for positioning. When the timekeeping mode is selected by the mode changing unit, the initial threshold value setting unit sets the initial signal reception threshold value to a signal reception threshold value for timekeeping that is lower than the first signal reception threshold value for positioning.

With this aspect of the invention, the initial threshold value setting unit lowers the signal reception threshold value according to the condition of the reception environment from a first signal reception threshold value for positioning to a second signal reception threshold value for positioning corresponding to the reception environment.

More specifically, because a process that acquires positioning information and orbit information from the satellite signals of at least three positioning information satellites, and calculates the position based on this information, is executed in the positioning mode, accurate, more precise information is required than in the timekeeping mode that extracts only time information. In order to acquire this information quickly, the same process described above is executed in the positioning mode, that is, a signal reception threshold value is set optimally for the reception environment and satellite signals are received based on the signal reception threshold value.

In the timekeeping mode, however, acquiring only the time information from the transmitted satellite signals is sufficient. This situation does not require highly precise satellite signals as are required in the positioning mode, and time information can be sufficiently acquired even from weak satellite signals containing noise. Satellite signals can therefore be acquired from any positioning information satellite if the satellite signal has signal strength sufficient to acquire the time information. That is, a signal reception threshold value for timekeeping that is lower than the first signal reception threshold value for positioning and is sufficient to receive time information can be set, and satellite signals with signal strength greater than or equal to this signal reception threshold value can be received. By executing such a process, a reception environment detection process and a threshold value process that sets the signal reception threshold value according to the detected reception environment can be omitted in the timekeeping mode, and satellite signals can be received more quickly.

An electronic timepiece according to another aspect of the invention preferably has a mode changing unit that changes to a timekeeping mode for acquiring the time information using the information acquisition unit, or a positioning mode that acquires the positioning information contained in the satellite signal using the information acquisition unit and calculates the position of the electronic timepiece. When the positioning mode is selected by the mode changing unit, the initial threshold value setting unit sets the initial value of the signal reception threshold value according to the reception environment detected by the reception environment detection unit to a specific first signal reception threshold value for positioning, or to a second signal reception threshold value for positioning that is lower than the first signal reception threshold value for positioning, and the threshold value changing unit lowers the signal reception threshold value according to the search count from the initial signal reception threshold value set by the initial threshold value setting unit. When the timekeeping mode is selected by the mode changing unit, the initial threshold value setting unit sets a fixed threshold value for timekeeping that is lower than the first signal reception threshold value for positioning as the initial signal reception threshold value, and the threshold value changing unit does not lower the fixed threshold value for timekeeping.

When the positioning mode is selected by the mode changing unit in this aspect of the invention, the threshold value changing unit reduces the signal reception threshold value according to the correlation count. As a result, satellite signals can be captured sequentially from the satellite signals with the highest signal strength, and high reliability satellite signals can be received preferentially.

In the timekeeping mode, however, the signal reception threshold value is locked to a fixed threshold value for timekeeping regardless of the reception environment, and the threshold value changing unit does not change this value. Time information can be extracted from the received satellite signal even in this configuration if the fixed threshold value for timekeeping is set to a signal strength level that enables acquiring time information. Yet further, because the process in which the threshold value changing unit lowers the signal reception threshold value can be omitted, the processor load can be further reduced and power consumption can be further suppressed.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 9 shows the change in the signal reception threshold value and the satellite signal reception state when the GPS wristwatch according to a second embodiment of the invention is located outdoors.

DESCRIPTION OF THE PREFERRED EMBODIMENTS

Embodiment 1

A preferred embodiment of a first embodiment of the invention is described below with reference to the accompanying figures.

Figure 1:
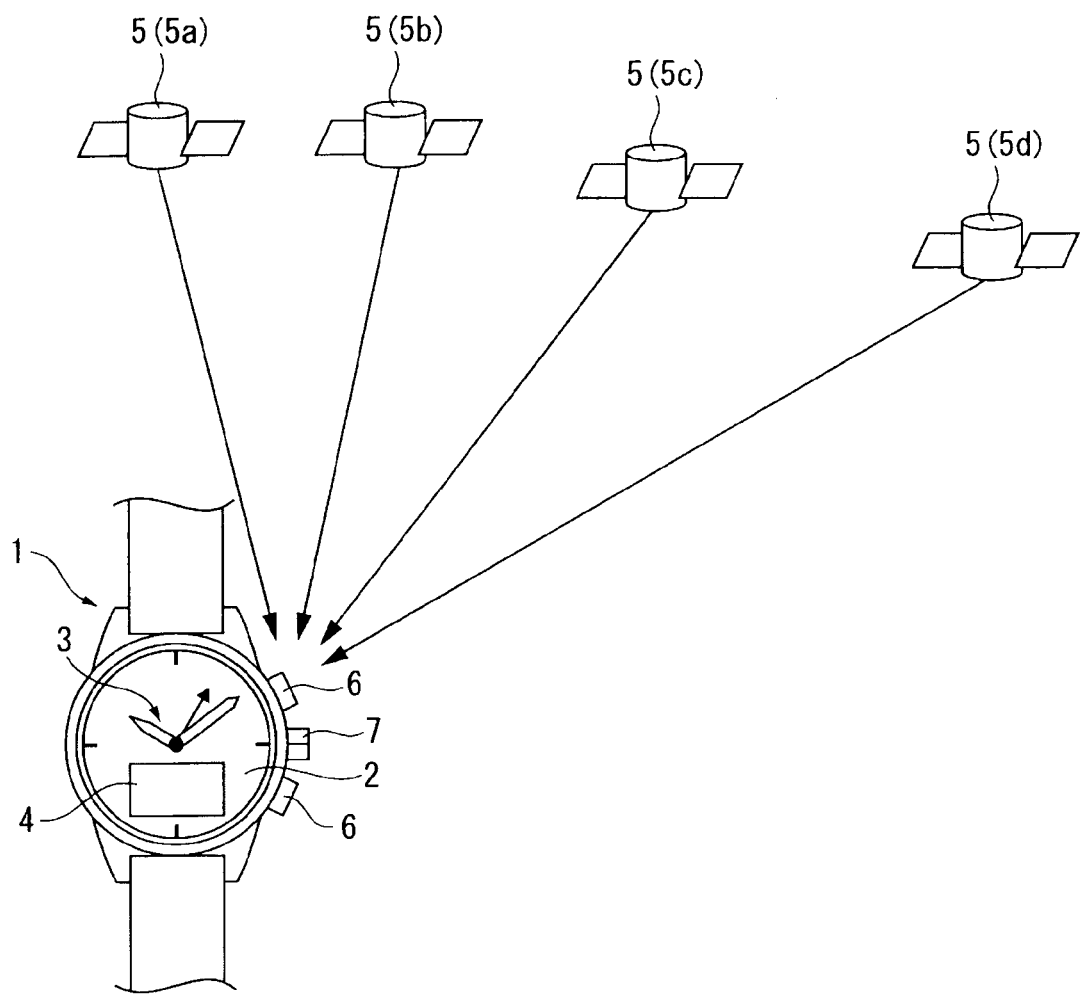
FIG. 1 shows an example of a GPS wristwatch as an example of an electronic timepiece according to a first embodiment of the invention.

FIG. 1 shows a wristwatch with a GPS satellite signal reception device 1 (referred to as a GPS wristwatch 1 herein) as an example of an electronic timepiece according to the invention.

As shown in FIG. 1, the GPS wristwatch 1 has a display including a dial 2 and hands 3. A window is formed in part of the dial 2, and a display 4 such as an LCD panel is disposed therein. The GPS wristwatch 1 is thus a combination timepiece having both hands 3 and a display 4.

The hands 3 include a second hand, minute hand, and hour hand, for example, and are driven by a stepping motor through a wheel train.

The display 4 is rendered by a LCD panel, for example, and in addition to time difference data as described below can display the current time, messages, and other information.

The GPS wristwatch 1 is configured to receive satellite signals and acquires satellite time information from a plurality of GPS satellites 5 orbiting the Earth on known orbits in space, and can correct the internal time information and display positioning information, that is, the current location, on the display 4.

Buttons 6 and a crown 7 are disposed to the GPS wristwatch 1 as input devices (external operating members).

GPS satellites 5 (5a, 5b, 5c, 5d) orbit the Earth on specific known orbits and transmit navigation messages superposed to a 1.57542 GHz microwave carrier (L1 signal) to Earth. Note that a GPS satellite 5 is an example of a positioning information satellite in a preferred embodiment of the invention, and the 1.57542 GHz microwave carrier signal with a superposed navigation message (referred to below as the "satellite signal") is an example of a satellite signal in a preferred embodiment of the invention.

There are currently approximately 30 GPS satellites 5 in orbit, and in order to identify the GPS satellite 5 from which a satellite signal was transmitted, each GPS satellite 5 superposes a unique 1023 chip (1 ms period) pattern called a Coarse/Acquisition Code (CA code) to the satellite signal. The C/A code is an apparently random pattern in which each chip is either +1 or −1. The C/A code superposed to the satellite signal can therefore be detected by correlating the satellite signal with the pattern of each C/A code.

Each GPS satellite 5 has an atomic clock on board, and the satellite signal carries the extremely accurate time information (called the "GPS time information" below) kept by the atomic clock. The miniscule time difference of the atomic clock on board each GPS satellite 5 is measured by a terrestrial control segment, and a time correction parameter for correcting the time difference is also contained in the satellite signal. A satellite signal reception device ("GPS receiver" below) built in to a GPS wristwatch 1 can therefore receive the satellite signal transmitted from one GPS satellite 5 and adjust the internally kept time to the correct time by using the GPS time information and time correction parameter contained in the received signal.

Orbit information describing the location of the GPS satellite 5 on its orbit is also contained in the satellite signal. The GPS receiver can perform a positioning calculation using the GPS time information and the orbit information. This positioning calculation assumes that there is a certain amount of error in the internal time kept by the GPS receiver. More specifically, in addition to the x, y, and z parameters for identifying the three-dimensional position of the GPS receiver, the time difference is also an unknown value. As a result, a GPS receiver generally receives satellite signals transmitted from four or more GPS satellites, and performs the positioning calculation using the GPS time information and orbit information contained in the received signals.

Circuit Configuration of a GPS Wristwatch

Figure 2:
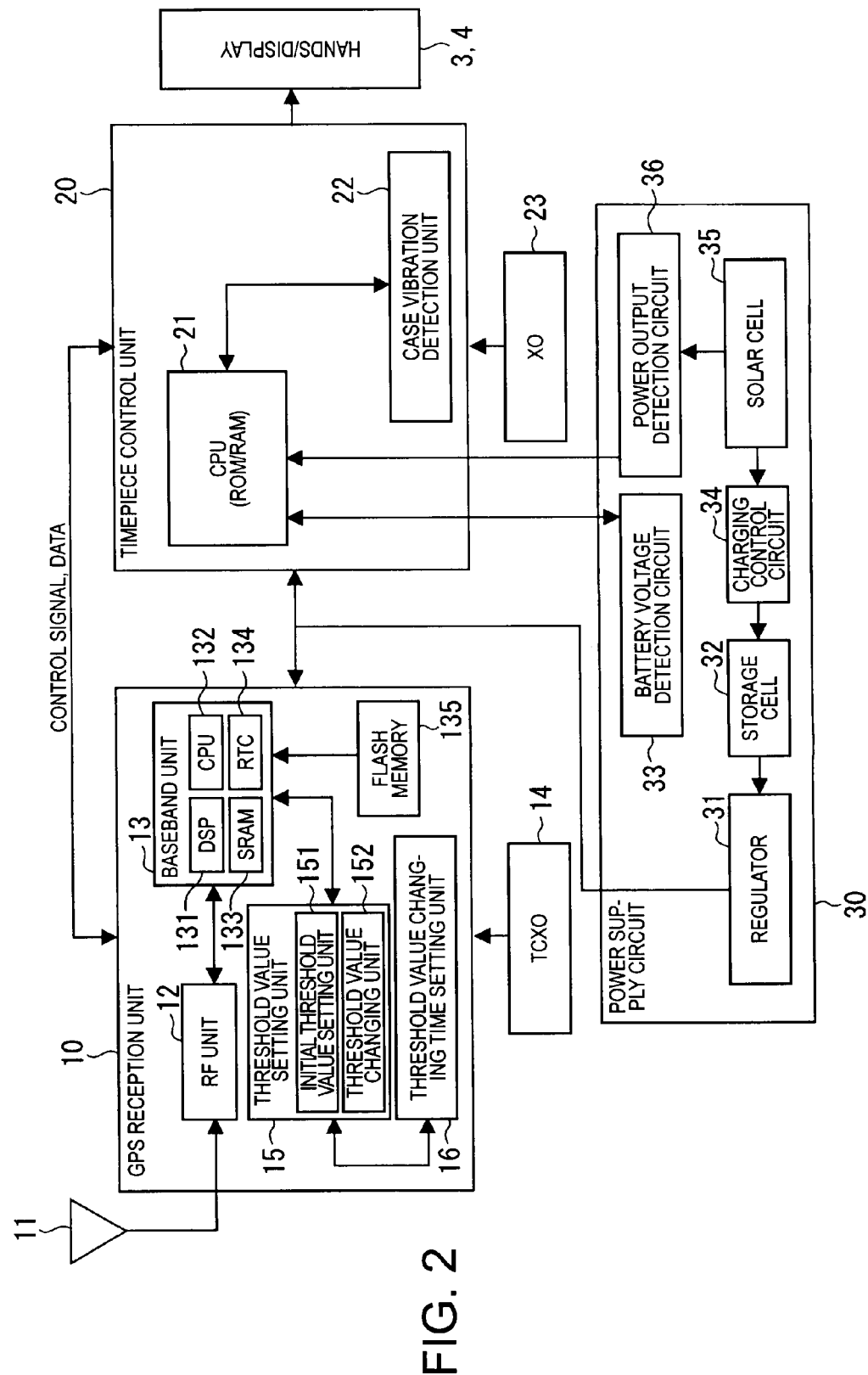
FIG. 2 is a block diagram showing the circuit configuration of the GPS wristwatch 1 according to a preferred embodiment of the invention.

FIG. 2 describes the circuit configuration of a GPS wristwatch 1 according to the first embodiment of the invention.

The GPS wristwatch 1 includes a GPS reception unit 10, which is a reception unit, a GPS antenna 11, a timepiece control unit 20, and a power supply circuit 30.

Reception Module Configuration

Figure 3:
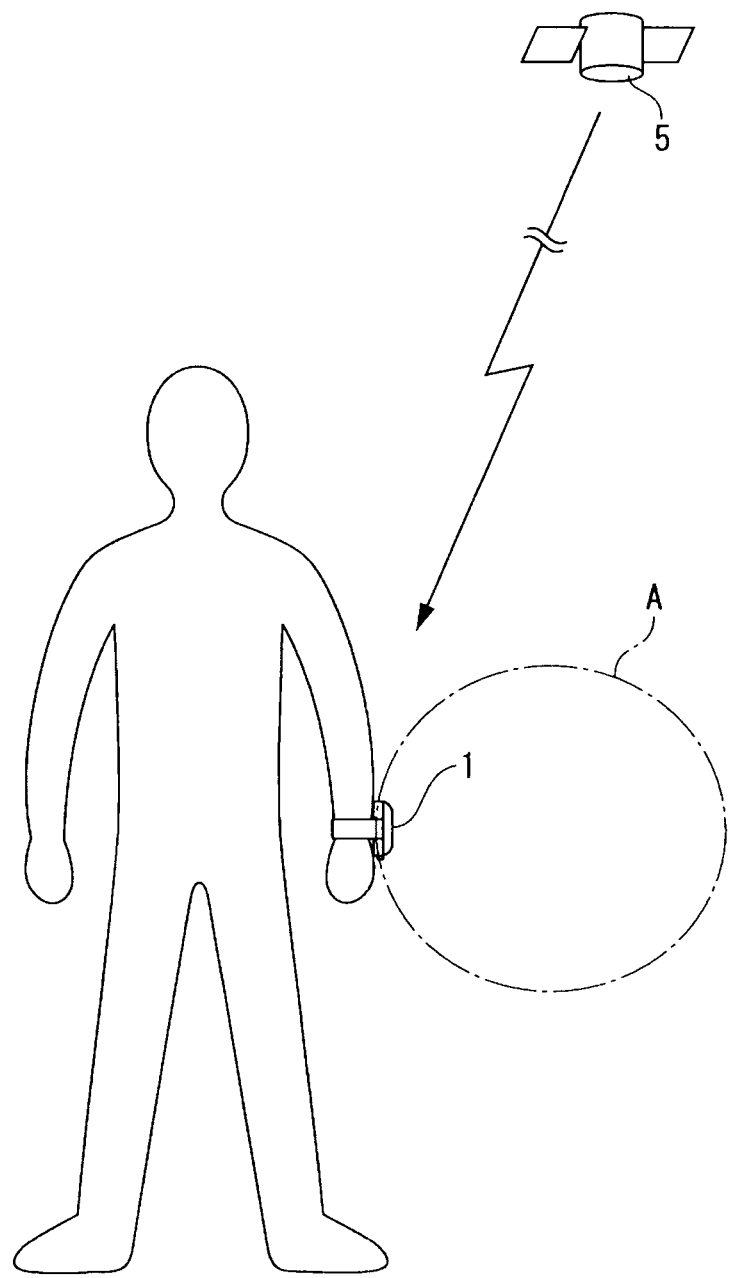
FIG. 3 shows satellite signal reception and antenna direction when the GPS wristwatch 1 is worn on the user's wrist.
Figure 4:
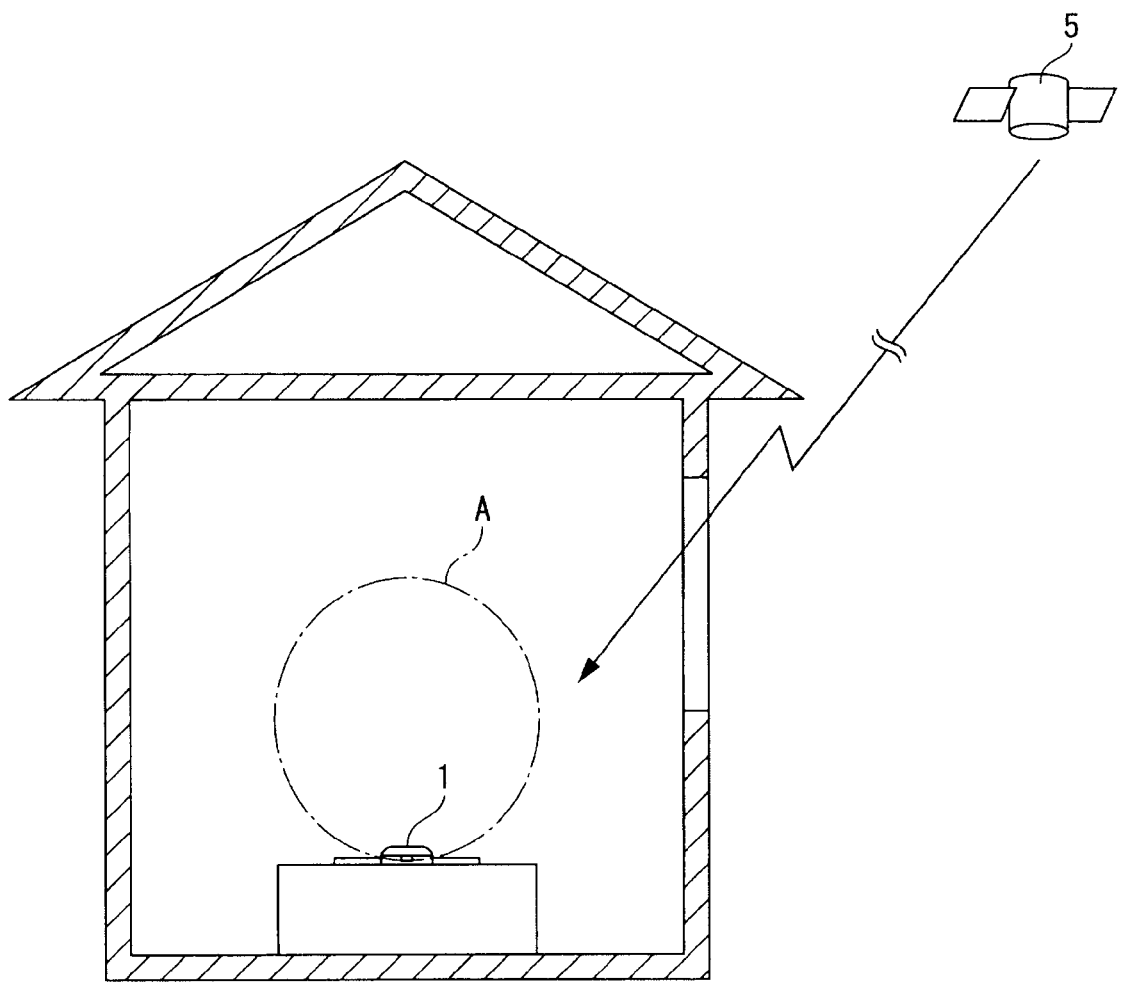
FIG. 4 shows satellite signal reception and antenna direction when the GPS wristwatch 1 is located indoors.

A GPS antenna 11 is connected to the GPS reception unit 10. The GPS antenna 11 is an antenna for receiving satellite signals from a plurality of GPS satellites 5. As shown in FIG. 3 and FIG. 4, the GPS antenna 11 is directed to the face side of the timepiece (indicated by the dot-dash lines A in the figures). FIG. 3 shows the directional pattern of the antenna and satellite signal reception when the GPS wristwatch 1 is worn on the user's wrist, and FIG. 4 shows the directional pattern of the antenna and satellite signal reception when the GPS wristwatch 1 is set down indoors.

The GPS antenna 11 receives satellite signals entering from the antenna direction A side. Therefore, to receive satellite signals with high signal strength from an GPS satellite 5 positioned at a high elevation angle, the GPS wristwatch 1 is preferably held substantially horizontal relative to the Earth's surface so as to face a high elevation angle, which is substantially perpendicular to the Earth's surface, when outdoors with no obstructions overhead. However, the GPS wristwatch 1 is normally worn on the user's wrist as shown in FIG. 3, or is set down when indoors. When the GPS wristwatch 1 is worn on the user's wrist and the user is walking as shown in FIG. 3, the direction A of the GPS antenna changes in different directions as the wrist moves, and it becomes difficult to receive satellite signals from a GPS satellite 5 at a high elevation angle. In addition, when the GPS wristwatch 1 is set down indoors as shown in FIG. 4, receiving strong satellite signals from a GPS satellite 5 located at a high elevation angle is difficult because satellite signals from GPS satellites 5 at a high elevation angle are blocked by the ceiling. As a result, when the reception environment is poor, satellite signals from GPS satellites located at a low elevation angle and satellite signals with multipath interference are received and processed.

The GPS reception unit 10 includes an RF (radio frequency) unit 12, baseband unit 13, threshold value setting unit 15, and a threshold value changing time setting unit 16.

The RF unit 12 is the same as the RF unit used in a common GPS receiver, and detailed description thereof is omitted. The RF unit 12 converts the received satellite signal to a digital signal and outputs to the baseband unit 13.

The baseband unit 13 includes a DSP (Digital Signal Processor) 131, CPU (Central Processing Unit) 132, SRAM (Static Random Access Memory) 133, and RTC (real-time clock) 134.

A TCXO (temperature compensated crystal oscillator) 14 is also connected to the GPS reception unit 10, and flash memory 135, for example, is connected to the baseband unit 13.

The TCXO 14 generates a reference clock signal with a substantially constant frequency regardless of the temperature.

Time difference information is stored in the flash memory 135. This time difference information defines the time difference in each of the different time zones into which geographical information is divided.

The baseband unit 13 runs a process that demodulates (decodes) the baseband signal from the digital signal (a signal of an intermediate frequency band) produced by the RF unit 12.

To capture a satellite signal, the baseband unit 13 generates a local code with the same pattern as each C/A code, and executes a process to correlate the C/A code contained in the baseband signal with a local code.

The baseband unit 13 also adjusts the output timing of the local code to achieve the peak correlation value to each local code, and when the correlation value equals or exceeds a specific correlation threshold value, determines successful synchronization with the GPS satellite 5 matching that local code (that is, determines a lock on the satellite signal from the GPS satellite 5).

Note that the GPS system uses a CDMA (code division multiple access) system enabling all GPS satellites 5 to transmit satellite signals at the same frequency using different C/A codes. Therefore, a GPS satellite 5 that can be captured can be found by evaluating the C/A code contained in the received satellite signal.

Note that this embodiment of the invention uses a sliding correlation method that is executed primarily by the DSP 131.

The baseband unit 13 also detects the signal strength of the received satellite signal, and runs a process to capture the satellite signal if the signal strength is greater than or equal to a specific signal reception threshold value. This signal reception threshold value is set by the threshold value setting unit 15 and threshold value changing time setting unit 16.

The threshold value setting unit 15 executes a process that sets the signal reception threshold value. As shown in FIG. 2, the threshold value setting unit 15 has an initial threshold value setting unit 151 and a threshold value changing unit 152.

The initial threshold value setting unit 151 sets the initial signal reception threshold value based on the power output of the solar cell 35 and vibration of the GPS wristwatch 1. The initial threshold value setting unit 151 sets the initial threshold value based on a signal (power output detection signal) output from the a power output detection circuit 36, and a signal (vibration detection signal) output from a case vibration detection unit 22 (rendering the vibration detection unit of the invention).

The power output detection circuit 36 is a circuit connected to a solar cell 35. When the solar cell 35 is exposed to light and generates power, the power output detection circuit 36 outputs a power output detection signal corresponding to the power output of the solar cell 35 through the CPU 21 of the timepiece control unit 20 to the GPS reception unit 10. The brightness of indoor lighting is generally 5000 lx or less, and outdoor light is generally brighter than 5000 lx. Power output by the solar cell therefore differs indoors and outdoors, and the power output of the solar cell changes accordingly. As a result, the initial threshold value setting unit 151 can easily determine the reception environment based on the power output detection signal output from the power output detection circuit 36 indicating the power output of the solar cell.

When the timepiece case is subject to vibration, the case vibration detection unit 22 outputs a signal corresponding to the amount of vibration (a vibration detection signal) through the CPU 21 of the timepiece control unit 20 to the GPS reception unit 10.

Note that the power output detection circuit 36 and case vibration detection unit 22 function as a reception environment detection unit of the invention, and can determine the reception environment based on the power output detection signal and the vibration detection signal.

For example, when the GPS wristwatch 1 is outdoors with no obstructions above and is held so that the antenna is directed basically perpendicularly to the Earth's surface, reception of satellite signals from a GPS satellite 5 located at a high elevation angle is good and the reception environment is good. In this situation the solar cell 35 is conceivably generating power from sunlight, and the power output of the solar cell 35 is high. Vibration is also not detected by the case vibration detection unit 22. Therefore, when the reception environment is thus good, the initial threshold value setting unit 151 sets the initial value of the signal reception threshold value to the maximum value enabling capturing only satellite signals from a GPS satellite 5 at a high elevation angle.

This maximum is a value that is set as the initial value of the signal reception threshold value by the initial threshold value setting unit 151 when the reception environment is good, and is the value that is set when the power output of the solar cell 35 is comparable to the power output using sunlight and the vibration detected by the case vibration detection unit 22 is less than or equal to a specific threshold value. In this embodiment of the invention this maximum value is set to −135 dBm.

However, when the user wearing the GPS wristwatch 1 is walking around as shown in FIG. 3, the antenna direction changes according to the user's movements and the reception environment could be poor. The vibration detected by the case vibration detection unit 22 also increases because of the acceleration of the GPS wristwatch 1. Furthermore, when the GPS wristwatch 1 is indoors as shown in FIG. 4, signals cannot be received from a GPS satellite 5 located at a high elevation angle and the reception environment is poor. In addition, because the solar cell 35 is not exposed to sunlight and power generating efficiency drops, the power output detection signal output from the power output detection circuit 36 also drops. In such situations the initial threshold value setting unit 151 sets a value that enables capturing satellite signals from GPS satellites 5 at a low elevation, or more particularly a value that is lower by a specific amount than the foregoing maximum value, as the initial signal reception threshold value.

Note that the signal reception threshold value set in this situation may be, for example, a value that is selected according to the reception environment from among plural levels that are set between the foregoing predefined maximum and the minimum value enabling signal reception, or it may be calculated according to the reception environment.

At this time the initial threshold value setting unit 151 sets the signal reception threshold value according to the power output and amount of vibration if the power output of the solar cell 35 is less than the normal power output using sunlight, or the vibration detected by the case vibration detection unit 22 is greater than or equal to a specific threshold.

The initial threshold value setting unit 151 may calculate the initial value according to the detected power output and vibration. Alternatively, a lookup table storing power output, vibration, and initial threshold values corresponding to the power output and vibration levels may be stored in flash memory 135, for example, and the initial threshold value setting unit 151 may be configured to read the appropriate initial threshold value for the power output and vibration values.

The threshold value changing unit 152 executes a threshold value lowering process that lowers the signal reception threshold value set by the initial threshold value setting unit 151 according to the correlation count (search count) that is counted by a threshold value changing time setting unit 16 described below. In this embodiment of the invention this process lowers the threshold value by a specific amount when the required number of satellite signals cannot be captured and the correlation count of the threshold value changing time setting unit 16 goes to three.

Note that this required number of satellite signals is 1 in a timekeeping mode that adjusts the internal time based on time information contained in the satellite signals, and the required number of satellite signals is at least three in a navigation mode that calculates the current position based on GPS satellite 5 orbit information contained in the satellite signals.

The threshold value changing unit 152 therefore lowers the signal reception threshold value in the timekeeping mode when the correlation count is 3 and even one satellite signal cannot be captured, and lowers the signal reception threshold value in the positioning mode when the correlation count goes to 3 and 3 satellite signals cannot be captured.

The amount of decrease in the threshold value may be set desirably. If the decrease is set large, the time required to capture a satellite signal and complete reception becomes shorter. If the size of the decrease is small, satellite signals with high signal strength can be desirably acquired from a plurality of satellite signals. Furthermore, if the maximum and minimum threshold values are recorded in flash memory 135, for example, and the threshold value is lowered by the threshold value changing unit 152 to the minimum, the threshold value is not decreased further. If the correlation count of the threshold value changing time setting unit 16 reaches a specific value (3 in this embodiment of the invention) after the threshold value is set to the minimum, the GPS reception unit 10 stops the satellite signal reception process.

The threshold value changing time setting unit 16 counts the number of times the baseband unit 13 executes the correlation process, and each time a specific correlation count is reached outputs a signal reporting the timing for the threshold value changing unit to execute the threshold value lowering process. This correlation process is a process that uses the C/A code to find the satellite corresponding to the GPS satellite 5 that transmitted the input satellite signal, and is equivalent to the search process of the invention. The correlation count is equivalent to the number of times the search process was executed, and thus is equivalent to the search count of the invention.

More specifically, each time the process determining the correlation between the input satellite signal and local codes 1 to 30 is executed, the threshold value changing time setting unit 16 increments the correlation count by 1.

Because the time required to determine the signal correlation is constant, the threshold value changing time setting unit 16 may be configured to count the correlation count by counting the time required for the correlation count to reach 1.

The baseband unit 13 demodulates (decodes) the navigation message by mixing the baseband signal with a local code of the same pattern as the C/A code of the captured GPS satellite 5, and stores the satellite information such as the orbit information and the GPS time information contained in the navigation message in SRAM 133.

The orbit information and GPS time information contained in the navigation message are an example of positioning information and time information in the invention, and the GPS reception unit 10 functions as the reception unit in the invention. In addition, because the baseband unit 13 of the GPS reception unit 10 acquires the positioning information and time information, it also functions as the information acquisition unit in the invention.

Note that the operation of the baseband unit 13 is synchronized to the reference clock signal output by the TCXO 14. The RTC 134 generates a timing signal for processing the satellite signal. The RTC 134 counts up at the reference clock signal output from the TCXO 14.

Timepiece Control Unit

The timepiece control unit 20 includes the control unit (CPU) 21 and the case vibration detection unit 22. A crystal oscillator (XO) 23 is connected to the timepiece control unit 20, and internal processes are executed using a reference signal output from the XO 23.

The case vibration detection unit 22 renders the reception environment detection unit of the invention. As described above, this case vibration detection unit 22 detects vibration of the GPS wristwatch 1, and has a vibration detection sensor not shown. When a signal is applied to the GPS wristwatch 1, the vibration detection sensor of the case vibration detection unit 22 detects the amount of vibration and outputs a detection signal corresponding to the amount of vibration.

By having the GPS reception unit 10 and timepiece control unit 20 described above, the GPS wristwatch 1 according to this embodiment of the invention can automatically correct the displayed time based on the satellite signal received from a GPS satellite 5.

Power Supply Device

The power supply circuit 30 includes a regulator 31, a storage cell 32, a battery voltage detection circuit 33, a charging control circuit 34, the solar cell 35, and the power output detection circuit 36 rendering a reception environment detection unit.

The storage cell 32 supplies drive power through the regulator 31 to the GPS reception unit 10 and timepiece control unit 20. The battery voltage detection circuit 33 operates according to a control signal from the CPU 21, and monitors the voltage of the storage cell 32.

The charging control circuit 34 is disposed between the solar cell 35 and the storage cell 32, and controls charging the storage cell 32 using current supplied from the solar cell 35.

The power output detection circuit 36 detects the power output of the solar cell 35 as described above, and outputs a power output detection signal corresponding to the output power to the CPU 21 of the timepiece control unit 20.

Reception Process

Figure 5:
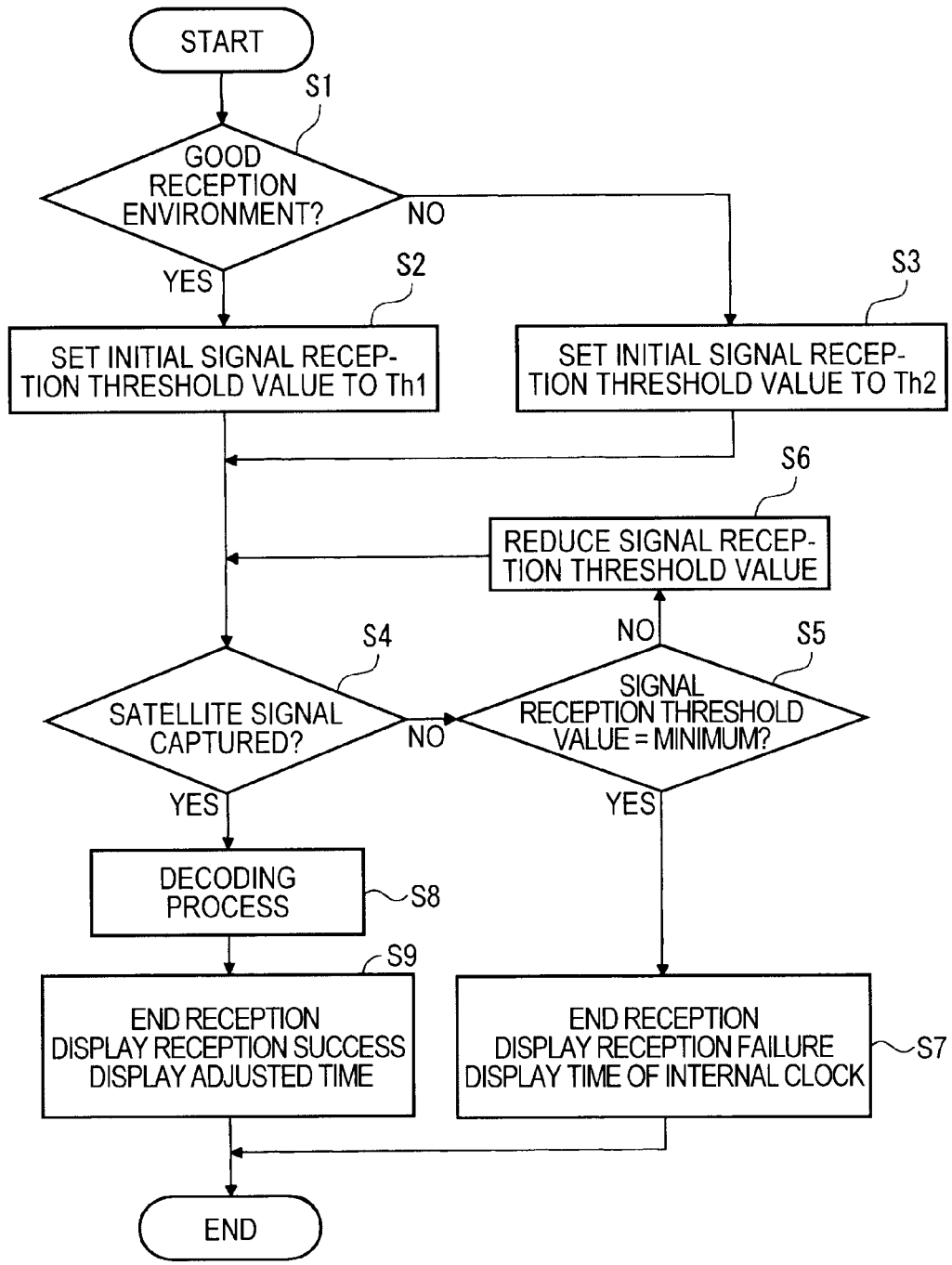
FIG. 5 is a flow chart of the satellite signals reception process of the GPS wristwatch according to a preferred embodiment of the invention.

The steps of the reception process executed by the GPS wristwatch 1 according to the first embodiment of the invention are described next with reference to the flow chart in FIG. 5.

When a manual reception process or an automatic reception process is executed, the threshold value setting unit 15 first detects the power output detection signal output from the power output detection circuit 36 and the vibration detection signal output from the case vibration detection unit 22, and determines whether or not the reception environment is good (step S1).

Note that a reference power output level for when the solar cell 35 receives and produces power from sunlight is previously stored in flash memory 135, and if the power output calculated from the power output detection signal output from the power output detection circuit 36 is greater than or equal to the reference power output level, the threshold value setting unit 15 determines that the GPS wristwatch 1 is outdoors and positioned with the antenna direction A toward a high elevation angle. The threshold value setting unit 15 also calculates the vibration of the GPS wristwatch 1 based on the vibration detection signal output from the case vibration detection unit 22, and determines the GPS wristwatch 1 is stationary if this amount of vibration is less than or equal to the vibration threshold value. When these two conditions are satisfied, that is, when the GPS wristwatch 1 is outdoors positioned with the antenna direction A facing a high elevation angle and is stationary, the initial threshold value setting unit 151 of the threshold value setting unit 15 decides that the reception environment is good.

On the other hand, if either one of these two conditions is not satisfied, that is, the power output determined from the power output detection signal is less than the reference power output level, or the amount of vibration based on the vibration detection signal is greater than the vibration threshold value, the initial threshold value setting unit 151 of the threshold value setting unit 15 determines the reception environment is poor.

If the reception environment is determined to be good in step S1, the initial threshold value setting unit 151 reads and sets the maximum Th1 that is previously stored in flash memory 135 as the initial signal reception threshold value (step S2).

However, if in step S1 the reception environment is determined to be poor, the initial threshold value setting unit 151 reads the signal reception threshold value for the power output and amount of vibration from a lookup table storing power output, vibration, and initial threshold values corresponding to the power output and vibration levels that is stored in flash memory 135, and sets the read value as the initial signal reception threshold value Th2 (step S3).

The baseband unit 13 then executes the satellite capture operation (search) to capture a satellite signal transmitted from a GPS satellite 5, and determines if a satellite signal was captured (step S4).

More specifically, the baseband unit 13 generates a local code with the same C/A code as the satellite number SV while changing the satellite number SV from 1 to 30. The baseband unit 13 then calculates the correlation between the local code and the C/A code contained in the baseband signal. If the C/A code contained in the baseband signal and the local code are the same, the correlation value will peak at a specific time, but if they are different codes, the correlation value will not have a peak and will always be substantially 0.

The baseband unit 13 adjusts the output timing of the local code so that the correlation value of the local code and the C/A code in the baseband signal goes to the peak. If the correlation value is greater than or equal to a specific threshold value, the baseband unit 13 detects the signal strength (SNR) of the satellite signal, and determines if the detected signal strength is greater than or equal to the signal reception threshold value. If the correlation value is greater than or equal to the specific threshold value and the signal strength is greater than or equal to the signal reception threshold value, the baseband unit 13 determines that the GPS satellite 5 of the satellite number SV was captured.

The threshold value changing time setting unit 16 of the threshold value setting unit 15 also starts counting the correlation count using the baseband unit 13 at this time. More specifically, the threshold value changing time setting unit 16 increments the correlation count by 1 each time the correlation is calculated for satellite numbers SV 1 through 30.

The baseband unit 13 repeats the satellite capture process until the correlation count from the threshold value changing time setting unit 16 reaches the specific number (3 in this embodiment of the invention), but if it is determined that a satellite cannot be captured before this specific correlation count is reached (if step S4 returns No), the threshold value changing unit 152 of the threshold value setting unit 15 executes the process to lower the signal reception threshold value. The threshold value setting unit 15 then determines if the signal reception threshold value is the preset minimum value (step S5).

If in step S5 it is determined that the signal reception threshold value is not the minimum, the threshold value changing unit 152 executes the process of decreasing the currently set signal reception threshold value by the predetermined decrease (step S6), and step S4 then repeats.

If the signal reception threshold value is determined to be the minimum in step S5 and the specific correlation count (3 in this example) is reached, the satellite signal reception process of the GPS reception unit 10 is ended. In this situation the timepiece control unit 20 displays a message that reception failed on the display 4, for example, and causes the hands 3 to display the time kept by the internal timekeeping unit (step S7).

Note that the GPS wristwatch 1 can be set by the user to a timekeeping mode in which only time information is acquired from a satellite signal and the time is adjusted based on the acquired time information, or a positioning mode in which GPS satellite 5 orbit information is acquired from the satellite signals and the current location of the GPS wristwatch 1 is calculated.

When the timekeeping mode is selected, time information is acquired based on the received satellite signal if at least one satellite signal is received by the time the specific correlation count is reached when the signal reception threshold value is set to the minimum.

However, because at least three satellite signals must be received in the positioning mode, the reception process is stopped if three or more satellite signals cannot be captured (such as when only two satellite signals are captured) by the time the specific correlation count is reached when the signal reception threshold value is set to the minimum.

If it is determined in step S4 that a satellite signal was captured, the baseband unit 13 executes a process to decode the captured satellite signal (step S8).

The timepiece control unit 20 then displays information on the display 4 indicating that reception succeeded, and executes a process that corrects the time of the internal clock based on the time information acquired in step S7 and displays the corrected time using the hands 3 (step S9).

Figure 6:
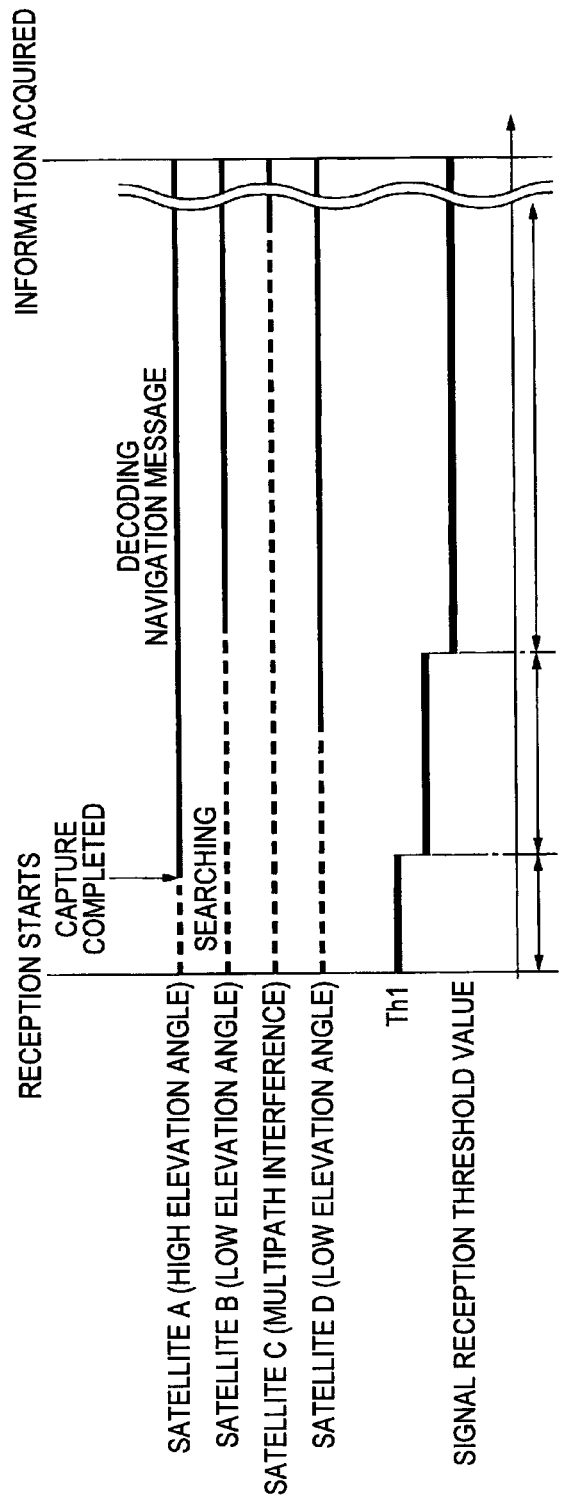
FIG. 6 shows the change in the signal reception threshold value and the satellite signal reception state when the GPS wristwatch according to this embodiment of the invention is located outdoors.
Figure 7:
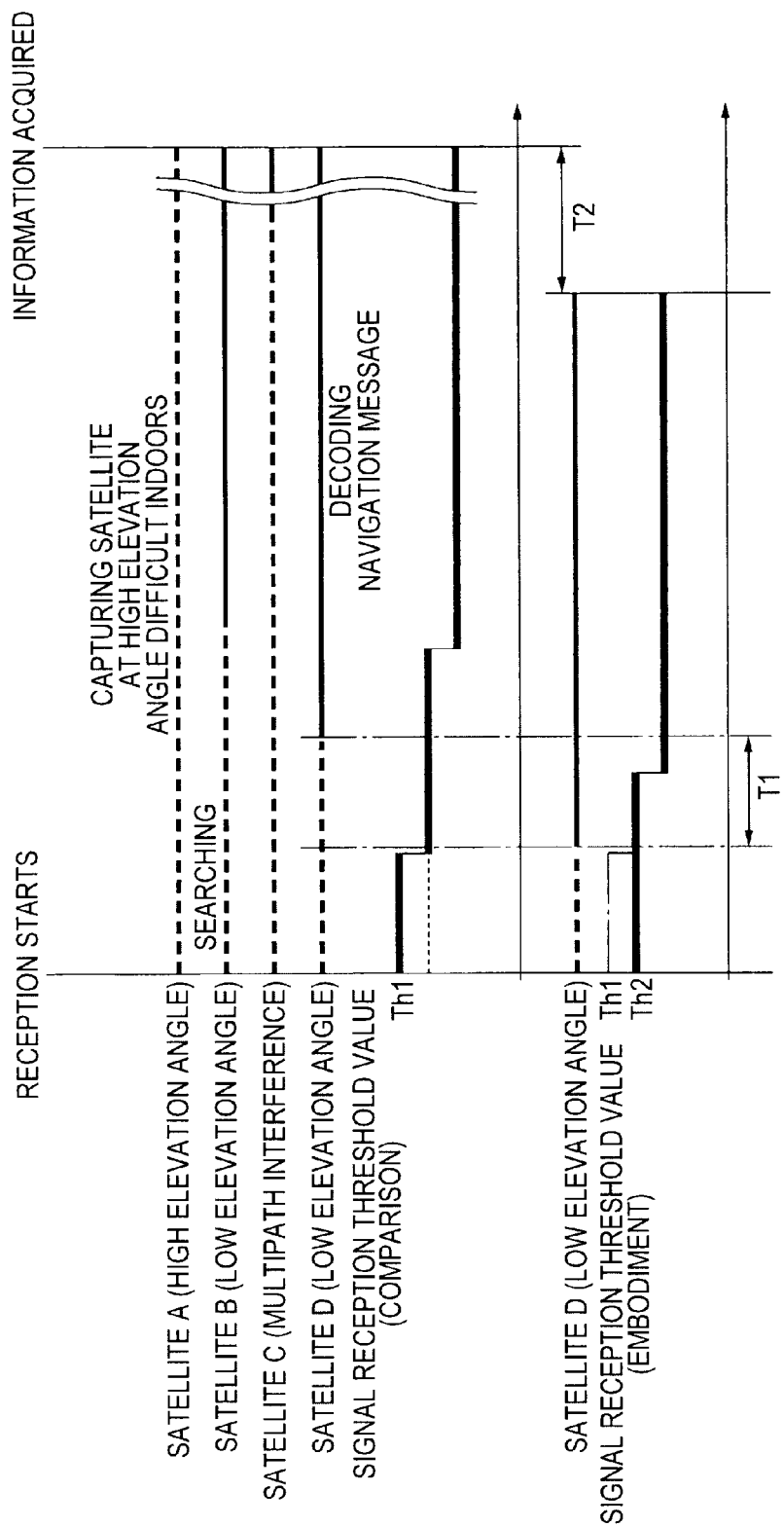
FIG. 7 shows the change in the signal reception threshold value and the satellite signal reception state when the GPS wristwatch according to this embodiment of the invention is located indoors.
Figure 8:
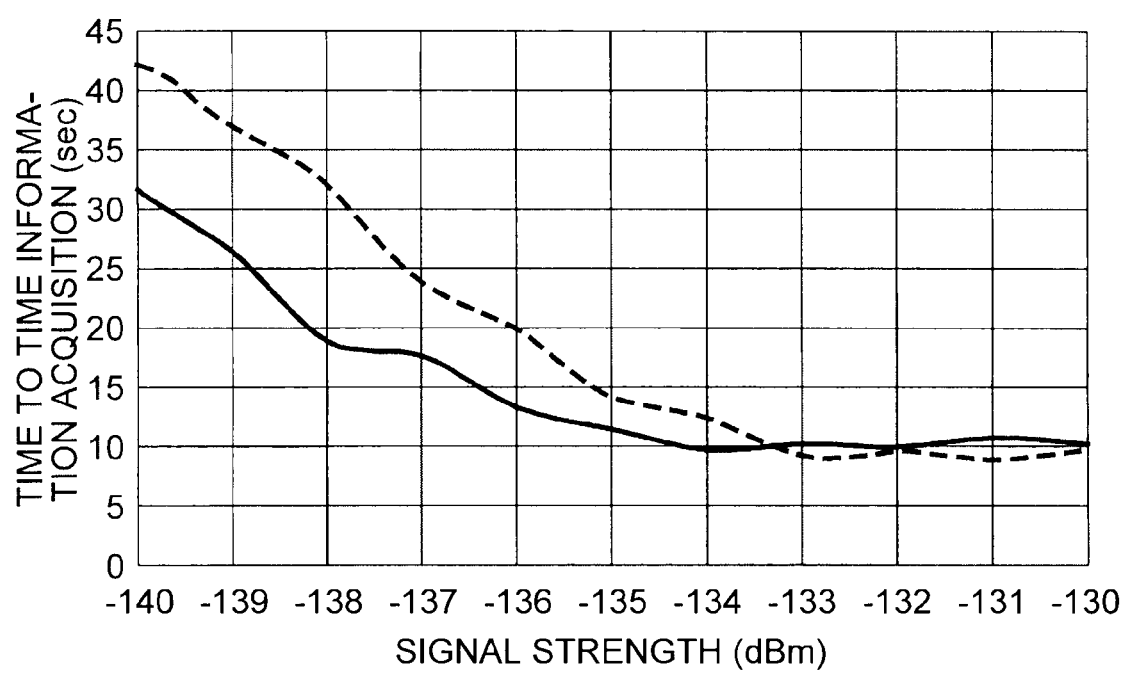
FIG. 8 shows the relationship between signal strength and the time required for time information acquisition in a GPS wristwatch according to this embodiment of the invention.

The relationship between satellite signal capture states and change in the signal reception threshold value in this embodiment of the invention is described next with reference to FIG. 6 to FIG. 8. Note that in FIG. 6 and FIG. 7 the dotted line parts of satellites A to D mean that the satellite is still being searched for and has not been captured. The solid line parts mean that the satellite was captured and the satellite signal is being decoded. In addition, in FIG. 7 the top signal reception threshold value in the figure shows the setting in a comparison sample, and the signal reception threshold values on the bottom of the figure indicate the settings in this embodiment of the invention. Note, further, that in the line in FIG. 7 showing the signal reception threshold value in this embodiment of the invention, the dot-dash portion is the line denoting the initial signal reception threshold value in the comparison sample. FIG. 8 shows the relationship between signal strength and the time required to acquire time information, the broken line showing the comparison and the solid line showing the invention.

Note that the comparison sample shown in the figures executed the satellite signal capture process without setting a signal reception threshold value according to the reception environment.

When the reception environment is good, the maximum Th1 is set as the signal reception threshold value even in this embodiment of the invention. As a result, as shown in FIG. 6, the comparison and the invention execute the same process, and the time from reception start to information acquisition is the same.

However, when the reception environment is poor, such as when the timepiece is indoors, satellite signals from GPS satellites 5 located at a high elevation angle are blocked as shown in FIG. 4. Even in this situation, however, the comparison sets the maximum Th1 as the initial signal reception threshold value as shown in FIG. 7. As a result, the comparison cannot capture a satellite signal during the time until the signal reception threshold value lower process is executed by the threshold value changing unit 152, and can first capture a satellite signal from satellite D located at a low elevation angle after the signal reception threshold value is lowered by the threshold value changing unit 152.

The GPS wristwatch 1 according to this embodiment of the invention, however, lowers the initial signal reception threshold value when the reception environment is poor. Because satellite signals with signal strength equal to or greater than the signal reception threshold value can therefore be received, the satellite signal from satellite D can be captured before the signal reception threshold value is lowered by the threshold value changing unit 152, the GPS wristwatch 1 of the invention can capture the satellite signal from satellite D time T1 sooner than the comparison, and can shorten the information acquisition time by time T2.

Therefore, as shown in FIG. 8, the difference between the comparison and this embodiment of the invention not great when satellite signal strength is high, but when the satellite signal strength is low, the GPS wristwatch 1 according to this embodiment of the invention can capture the satellite signal more quickly and can suppress power consumption accordingly.

Effect of the First Embodiment

As described above, the initial threshold value setting unit 151 of the threshold value setting unit 15 in the GPS wristwatch 1 according to the first embodiment of the invention evaluates the reception environment based on signals output from the power output detection circuit 36 and case vibration detection unit 22, and sets the initial value of the signal reception threshold value according to the reception environment. The baseband unit 13 then captures a satellite signal with signal strength equal to or greater than this set signal reception threshold value and runs a decoding process. When the correlation count kept by the threshold value changing time setting unit 16 goes to a specific value, the threshold value changing unit 152 of the threshold value setting unit 15 lowers the signal reception threshold value.

Because a high signal reception threshold value is thus set when the reception environment is good, only good satellite signals with a high signal strength can be received. When the reception environment is poor, capturing satellite signals from a GPS satellite 5 located at a high elevation angle may not be possible, but if the signal reception threshold value is set low according to the reception environment, satellite signals such as signals from GPS satellites 5 at a low elevation and signals with multipath interference can be captured soon after reception starts even in a reception environment in which only satellite signals with low signal strength can be received. The power consumption required for the satellite signal reception process can therefore be suppressed by shortening the total time from reception start to reception end (completion of the decoding process).

The GPS wristwatch 1 has a solar cell 35 and a power output detection circuit 36 that detects the power output of the solar cell 35, and the power output detection circuit 36 functions as a reception environment detection unit of the invention.

More specifically, when the GPS wristwatch 1 is used outdoors as described above, the power output of the solar cell 35 is high because the solar cell 35 can receive plentiful sunlight. In this situation there is no obstruction above the GPS wristwatch 1, and the reception environment enables good reception of satellite signals with high signal strength from GPS satellites 5 located at a high elevation angle. Therefore, by detecting the power output of the solar cell 35 using the power output detection circuit 36, whether or not the GPS wristwatch 1 is located outdoors can be determined, the reception environment can be easily determined, and the initial signal reception threshold value can be easily set according to the identified reception environment.

The GPS wristwatch 1 also has a case vibration detection unit 22, and this case vibration detection unit 22 functions as a reception environment detection unit of the invention.

More specifically, when a user wearing the GPS wristwatch 1 on his wrist is walking and the user passes near a building, for example, satellite signals may be blocked by the building and the reception environment may deteriorate. In addition, the antenna direction A points in different directions as the wrist swings, and reception sensitivity is poor compared with when the GPS wristwatch 1 is stationary in a fixed position.

In a GPS wristwatch 1 according to this embodiment of the invention, however, a vibration detection signal corresponding to swinging of the wrist is output from the case vibration detection unit 22, and the initial threshold value setting unit 151 calculates the amount of vibration of the GPS wristwatch 1 based on this vibration detection signal and sets the initial signal reception threshold value according to the amount of vibration. As a result, by determining if the amount of vibration is greater than or equal to a vibration threshold, the initial threshold value setting unit 151 can easily evaluate the reception environment and can easily set the initial signal reception threshold value according to the reception environment.

The baseband unit 13 also stops (times out) the satellite signal reception operation when the signal reception threshold value is set to the minimum by the threshold value changing unit 152 and a satellite signal cannot be captured by the time the correlation process executes a specific number of times (correlation count).

More specifically, when the reception environment is particularly poor and a satellite signal cannot be received, the reception process is not repeatedly executed multiple times. The power consumption required for the reception process can therefore be suppressed, the power in the storage cell 32 can be made to last a longer time, and system shutdowns resulting from a loss of power can be prevented. Problems such as receiving satellite signals with signal strength below the minimum and acquiring mistaken information can also be avoided.

Embodiment 2

A second embodiment of the invention is described next with reference to FIG. 9. FIG. 9 schematically describes the satellite signal reception method of a GPS wristwatch 1 according to the second embodiment of the invention.

The GPS wristwatch 1 according to the foregoing first embodiment of the invention runs a process that sets the signal reception threshold value according to the reception environment both when extracting time information from one satellite signal and adjusting the displayed time (in the timekeeping mode), and when extracting GPS satellite 5 positioning information from a plurality of satellite signals and calculating the current location based on this positioning information (in the positioning mode). When operating in the positioning mode that requires receiving satellite signals with higher signal strength, the GPS wristwatch 1 according to the second embodiment of the invention sets the signal reception threshold value according to the reception environment by unit of the same process executed in the first embodiment so that satellite signals with high signal strength can be acquired more quickly under the current reception environment. When in the timekeeping mode, however, the signal reception threshold value is set to a specific value that is lower than the maximum regardless of the reception environment in order to receive a satellite signal.

The structure of the satellite signal (navigation message) transmitted from a GPS satellite 5 is described next.

Figure 10A:
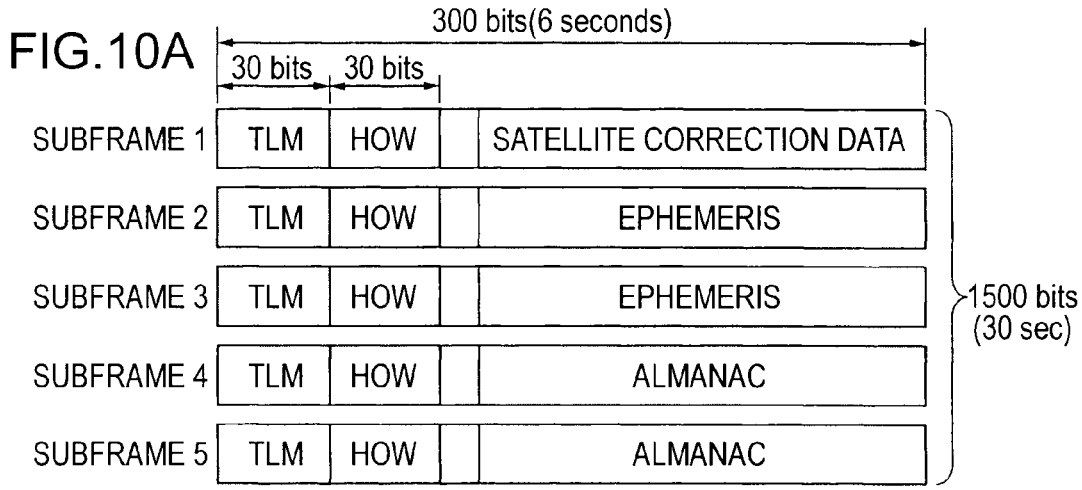
FIGS. 10A, 10B, and 10C illustrate the configuration of a satellite signal (navigation message) transmitted from a GPS satellite.
Figure 10B:
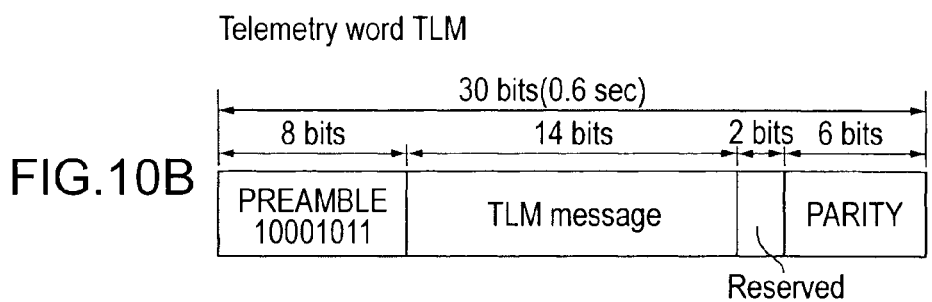
Figure 10C:
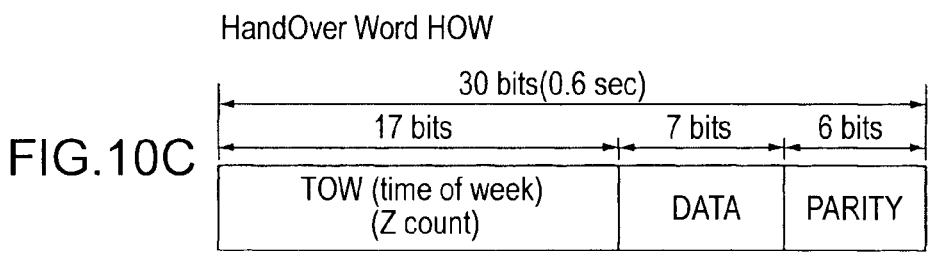

FIGS. 10A, 10B, and 10C illustrate the structure of a satellite signal (navigation message) transmitted from a GPS satellite 5.

As shown in FIG. 10A, the navigation message is composed of data organized in a single main frame containing a total 1500 bits. The main frame is divided into five subframes of 300 bits each. The data in one subframe is transmitted in 6 seconds from each GPS satellite 5. It therefore requires 30 seconds to transmit the data in one main frame from each GPS satellite 5.

Subframe 1 contains satellite correction data such as the week number. The week number identifies the week to which the current GPS time information belongs. The GPS time starts at 00:00:00 on Jan. 6, 1980, and the number of the week that started that day is week number 0. The week number is updated every week.

Subframes 2 and 3 contain ephemeris data, that is, detailed orbit information for each GPS satellite 5. Subframes 4 and 5 contain almanac data (general orbit information for all GPS satellites 5 in the constellation).

Each of subframes 1 to 5 starts with a telemetry (TLM) word containing 30 bits of telemetry (TLM) data, followed by a HOW word containing 30 bits of HOW (handover word) data.

Therefore, while the TLM words and HOW words are transmitted at 6-second intervals from the GPS satellite 5, the week number data and other satellite correction data, ephemeris data, and almanac data are transmitted at 30-second intervals.

As shown in FIG. 10B, the TLM word contains preamble data, a TLM message, reserved bits, and parity data.

As shown in FIG. 10C, the HOW word contains GPS time information called the TOW or Time of Week (also called the Z count). The Z count denotes in seconds the time passed since 00:00 of Sunday each week, and is reset to 0 at 00:00 of Sunday each week. More specifically, the Z count denotes the time passed from the beginning of each week in seconds. The Z count denotes the GPS time at which the first bit of the next subframe data is transmitted. For example, the Z count transmitted in subframe 1 denotes the GPS time that the first bit in subframe 2 is transmitted.

The HOW word also contains 3 bits of data denoting the subframe ID (also called the ID code). More specifically, the HOW words of subframes 1 to 5 shown in FIG. 10A contain the ID codes 001, 010, 011, 100, and 101, respectively.

The GPS receiver can usually get the GPS time information by acquiring the week number value contained in subframe 1 and the HOW words (Z count data) contained in subframes 1 to 5. However, if the GPS receiver has previously acquired the week number and internally counts the time passed from when the week number value was acquired, the current week number value of the GPS satellite can be obtained without acquiring the week number from the satellite signal. The GPS receiver can therefore know the current time, except for the date, once the Z count is acquired. The GPS receiver therefore normally acquires only the Z count as the time information.

Note that the TLM word, HOW word (Z count), satellite correction data, ephemeris, and almanac parameters are examples of satellite information in the invention.

The timekeeping mode in which a timekeeping process is executed is when the GPS wristwatch 1 acquires the Z count data, which is time information. The Z count data can be acquired from only one GPS satellite 5. In addition, because the Z count data is carried in each subframe, it is transmitted at a 6-second interval.

As a result, when receiving in the timekeeping mode, if the number of captured satellites is at least one, the reception time required to acquire the Z count data once is 6 seconds, the information that can be acquired is the Z count data (time information), and the ephemeris parameter and almanac parameter do not need to be received. Therefore, one Z count can be acquired with a required reception time of 6 seconds, and even if the Z count data is received two or three times to verify the received data, reception can be completed in a short time of 12 to 18 seconds.

Therefore, because it is sufficient if at least the Z count data can be acquired from a satellite signal in the timekeeping mode, highly reliable information can be acquired with little interference from noise, for example, even if the signal strength of the satellite signal is low.

Reception in the positioning mode is when the ephemeris parameter containing orbit information for each GPS satellite 5 is received from three or more satellites. This is because the ephemeris parameter must be acquired from at least three GPS satellites 5 for positioning. Note that because the ephemeris parameter is carried in subframes 2 and 3, the shortest reception time needed to acquire the ephemeris parameters is 18 seconds (to receive subframes 1 to 3). Therefore, if signals are captured and received simultaneously from a plurality of GPS satellites 5, approximately 30 seconds to 1 minute is required in a cold-start state in which almanac data is not stored locally to receive the ephemeris parameters, run the positioning calculation, and acquire the positioning data.

As a result, reception in the positioning mode is a process in which the number of captured satellites is at least 3, the required reception time is 30 seconds to 1 minute, the information to be acquired is the Z count data (time information) and the ephemeris parameters, and the almanac parameter is not received. The satellite signal reception time is therefore longer in the positioning mode than in the timekeeping mode, and receiving satellite signals with high reliability may be difficult if the signal strength drops during reception, for example. It is therefore preferable in the positioning mode to receive satellite signals with high signal strength and higher reliability.

The reception process in the timekeeping mode of the GPS wristwatch 1 is also usually an automatic reception process that receives at a specific time, and the reception process in the positioning mode is manually started by the user. Operation of the GPS wristwatch 1 according to this embodiment of the invention can therefore change in the timekeeping mode and the positioning mode. The CPU 21 of the time control unit 20 in a GPS wristwatch 1 according to the second embodiment of the invention renders the mode switching unit of the invention. More specifically, the CPU 21 of the time control unit 20 sets the timekeeping mode during normal timepiece operation, and causes the GPS reception unit 10 to run the reception process for the timekeeping mode at a specific time interval. When a button 6 is then operated by the user, the CPU 21 switches to the positioning mode and causes the GPS reception unit 10 to run the reception process appropriate to the positioning mode. Note that this embodiment of the invention executes the reception process regularly at a specific time in the timekeeping mode, but depending on user settings could conceivably execute a process that changes to the timekeeping mode at a user-set timing.

As shown in FIG. 9, the GPS reception unit 10 executes the same process as in the first embodiment when in the positioning mode and sets the signal reception threshold value Th2 (second signal reception threshold value for positioning) according to the reception environment. As a result, satellite signals with high signal strength can be quickly received in the current reception environment. FIG. 9 shows an example of a good reception environment that is suitable for receiving satellite signals from GPS satellites 5 located at a high elevation angle, and the signal reception threshold value in the positioning mode is set to a first signal reception threshold value for positioning, which is the maximum (Th1).

In the timekeeping mode, however, the initial threshold value setting unit 151 of the GPS reception unit 10 sets the signal reception threshold value regardless of the reception environment to a signal reception threshold value for timekeeping Th3 that is lower than the first signal reception threshold value for positioning Th1 that is the maximum. This specific value may be a preset value stored in flash memory 135. In this configuration the threshold value changing unit 152 also executes the same process as in the first embodiment, and lowers the signal reception threshold value each time the correlation count goes to a specific value.

Effect of Embodiment 2

When the GPS wristwatch 1 according to the second embodiment of the invention is switched to the positioning mode by the CPU 21, the GPS wristwatch 1 executes the same process executed in the first embodiment. More specifically, the GPS wristwatch 1 executes a process whereby the reception environment is evaluated according to signals output from the power output detection circuit 36 and case vibration detection unit 22, the initial threshold value setting unit 151 sets the initial signal reception threshold value according to these signals, and the threshold value changing unit 152 lowers the signal reception threshold value each time a specific correlation count is reached. As a result, the same effect as the first embodiment is achieved when in the positioning mode, and satellite signals with high signal strength enabling reception according to the reception environment can be received quickly.

However, when the CPU 21 switches to the timekeeping mode, the initial threshold value setting unit 151 sets a preset value as the signal reception threshold value regardless of the signals from the power output detection circuit 36 and case vibration detection unit 22. As a result, if this initial value is set to a level enabling receiving the time information (Z count data), satellite signals can be captured and the time adjustment operation can be done more quickly. More specifically, even when the signal reception threshold value is set according to the reception environment, if there are no satellite signals with signal strength greater than the signal reception threshold value, satellite signals are captured after the signal reception threshold value is further reduced by the threshold value changing unit. However, by setting a signal reception threshold value for timekeeping, this embodiment of the invention can more quickly receive satellite signals with signal strength sufficient to enable receiving time information. Furthermore, because acquiring the time information is sufficient in the timekeeping mode, highly precise satellite signals are not required as they are in the positioning mode, and the time can be adjusted with sufficiently high precision even if a signal reception threshold value as described above is set.

The initial threshold value setting unit 151 also sets a signal reception threshold value for timekeeping that is greater than the minimum and less than the maximum threshold values. The threshold value changing unit incrementally reduces this signal reception threshold value for timekeeping each time a specific correlation count is reached. Therefore, compared with when the signal reception threshold value is set to the minimum from the start of signal reception, satellite signals with higher signal strength can be targeted for capture, and signals with higher reliability can be received.

Embodiment 3

Figure 11:
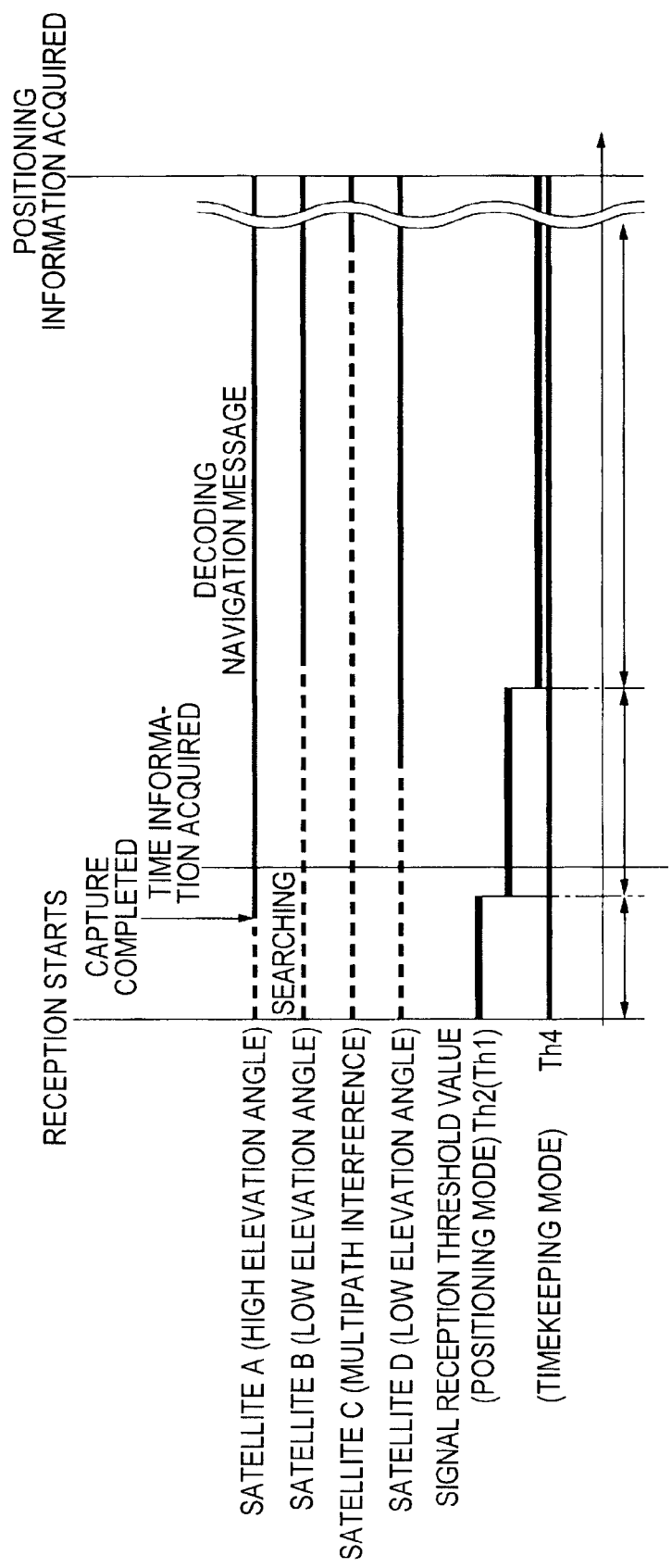
FIG. 11 shows the change in the signal reception threshold value and the satellite signal reception state when the GPS wristwatch according to a third embodiment of the invention is located outdoors.

A third embodiment of the invention is described next with reference to FIG. 11. FIG. 11 schematically describes the satellite signal reception method of a GPS wristwatch 1 according to the third embodiment of the invention.

After setting a preset signal reception threshold value in the timekeeping mode in the GPS wristwatch 1 according to the second embodiment of the invention, the threshold value changing unit 152 executes a process that lowers the signal reception threshold value each time a specific correlation count is reached. In this third embodiment of the invention, however, the signal reception threshold value is fixed in the timekeeping mode.

More specifically, in the positioning mode the initial threshold value setting unit 151 sets a second signal reception threshold value Th2 according to the reception environment in the same way as in the second embodiment and the first embodiment as shown in FIG. 11. The threshold value changing unit 152 also executes a process that reduces the signal reception threshold value each time a specific correlation count (such as 3) is reached.

In the timekeeping mode, however, the initial threshold value setting unit 151 sets a specific fixed timekeeping threshold value Th4 that is greater than the maximum signal reception threshold value (first signal reception threshold value for positioning) as the signal reception threshold value.

Note that the minimum (−140 dBm) is used as this fixed timekeeping threshold value Th4 in this third embodiment of the invention. As also shown in FIG. 11, the threshold value changing unit 152 of the GPS wristwatch 1 according to this third embodiment of the invention does not run a process to lower the signal reception threshold value when in the timekeeping mode as shown in FIG. 11. As a result, the signal reception threshold value that is set by the initial threshold value setting unit 151 is kept.

Note that in this configuration the threshold value changing time setting unit 16 counts the correlation count, and the baseband unit 13 executes a process that stops the reception operation when a satellite signal cannot be captured within the specified correlation count.

Yet further, the minimum is used as the fixed timekeeping threshold value Th4 above, but the invention is not so limited and a specific value between the minimum and the maximum may be set as the fixed threshold value for timekeeping.

Effect of Embodiment 3

The GPS wristwatch 1 according to the third embodiment of the invention achieves the same effect as the foregoing second embodiment. More specifically, when the positioning mode is selected, the GPS wristwatch 1 executes a process whereby the reception environment is evaluated according to signals output from the power output detection circuit 36 and case vibration detection unit 22, the initial threshold value setting unit 151 sets the initial signal reception threshold value according to these signals, and the threshold value changing unit 152 lowers the signal reception threshold value each time a specific correlation count is reached. As a result, the same effect as the first embodiment is achieved when in the positioning mode, and satellite signals with high signal strength enabling reception according to the reception environment can be received quickly.

However, when the timekeeping mode is selected, the initial threshold value setting unit 151 sets a preset value as the signal reception threshold value regardless of the signals from the power output detection circuit 36 and case vibration detection unit 22. As a result, if this initial value is set to a level enabling receiving the time information (Z count data), satellite signals can be captured and the time adjustment operation can be done more quickly.

In addition, the signal reception threshold value that is set in the timekeeping mode is fixed in this third embodiment of the invention. As a result, the threshold value lowering process of the threshold value changing unit 152 is not necessary each time the correlation count reaches a specific count, and the power consumption related to this process can be suppressed.

The fixed threshold value for timekeeping is also set to the minimum value enabling satellite signal reception. As a result, even if satellite signals with signal strength between the signal reception threshold value for timekeeping that is set in the second embodiment and this fixed threshold value for timekeeping, which is the minimum, are input, these satellite signals can be received from the start of reception and the power consumption required for the correlation process can be further reduced.

Other Embodiments

The invention is not limited to the embodiments described above and can be varied in many ways without departing from the scope of the accompanying claims.

For example, in the first to third embodiments described above the threshold value changing unit 152 executes a process that lowers the signal reception threshold value each time a correlation count goes to a specific value (such as 3), but a process that gradually delays the timing at which the signal reception threshold value is reduced by the threshold value changing unit 152 may be used. For example, the threshold value changing unit 152 may execute a process that applies the threshold value lowering process a first time when the correlation count reaches 3 after reception starts, applies the threshold value lowering process a second time after the correlation process is executed an additional 5 times, and applies the threshold value lowering process a third time after the correlation process is executed an additional 7 times.

The threshold value changing unit 152 also executes a process that reduces the signal reception threshold value according to the correlation count, but may execute a process that, for example, references the time passed since the reception start based on an internal timer, and reduces the signal reception threshold value each time the time required to reach a specific correlation count passes.

The baseband unit described above stops the reception process when the signal reception threshold value is set to the minimum and a satellite signal cannot be captured even though the correlation process has executed a specific number of times, but may execute a process that stops the signal reception process when a satellite signal cannot be received by the time a specified time has passed after signal reception starts.

Yet further, a case vibration detection unit 22 that is a vibration detection unit is described as an example of the reception environment detection unit of the invention in each of the foregoing embodiments, but the invention is not so limited. For example, a configuration that detects the tilt angle of the GPS wristwatch 1 using a gyroscopic sensor is also conceivable as a reception environment detection unit. In this configuration the reception environment can be evaluated based on the antenna direction A.

Furthermore, in an electronic timepiece with a power generating function that produces power by causing a rotary pendulum to rotate as a result of timepiece vibration, the reception environment detection unit may be configured to detect vibration by detecting the power produced by movement of the rotary pendulum. This configuration can make a part of the power generating mechanism function as a reception environment detection unit, and can therefore simplify the timepiece configuration.

Yet further, the power output detection circuit 36 above is configured to detect the reception condition by detecting power output, but a configuration that determines from an internal clock whether it is daytime or nighttime, and detects the reception conditions using the power output detection circuit 36 only during daytime, is also conceivable.

Yet further, a configuration that uses a power output detection circuit 36 to detect the power output of a solar cell 35 and detects the reception environment based on this power output is used above as the reception environment detection unit, but a configuration that does not have a solar cell 35 and has only a photodetector is also conceivable. Because an electric signal is output by the photodetector according to the amount of incident light in this configuration, the reception state can be detected by detecting this electric signal.

The foregoing embodiments are described with reference to a GPS satellite 5 as an example of a positioning information satellite, but the positioning information satellite of the invention is not limited to GPS satellites 5 and the invention can be used with other Global Navigation Satellite Systems (GNSS) such as Galileo (EU), GLONASS (Russia), and Beidou (China), and other positioning information satellites that transmit satellite signals containing time information, including the SBAS and other geostationary or quasi-zenith satellites.

The electronic timepiece of the invention is also not limited to combination timepieces having hands and a display, and can be used with analog timepieces having only hands and digital timepieces having only a display. The invention is also not limited to wristwatches, and can be applied to pocket watches and other types of timepieces, as well as electronic devices with a clock function such as cell phones, digital cameras, and various kinds of portable information terminals.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An electronic timepiece comprising:
a reception unit that executes a search process to search for satellite signals that can be captured from among satellite signals transmitted from a plurality of positioning information satellites, and from among the satellite signals captured by the search process receives a satellite signal with signal strength greater than or equal to a specific signal reception threshold value;
an information acquisition unit that acquires specific information including at least time information based on a satellite signal received by the reception unit;
a display that displays acquired information;
a threshold value changing unit that lowers the signal reception threshold value according to a search count, which is the number of times the search process has been applied to the satellite signals of all positioning information satellites;
a reception environment detection unit that detects the reception environment of the satellite signal; and
an initial threshold value setting unit that sets the initial value of the signal reception threshold value according to the reception environment detected by the reception environment detection unit.

2. The electronic timepiece described in claim 1, wherein:
the reception unit stops the reception operation when the signal reception threshold value is set to a specific minimum by the threshold value changing unit, and the satellite signal cannot be captured within the specific search count after the signal reception threshold value is set to the minimum.

3. The electronic timepiece described in claim 1, further comprising:

a solar cell that receives light and produces electric power; and wherein the reception environment detection unit detects the reception environment based on power output from the solar cell.

4. The electronic timepiece described in claim 1, wherein:

the reception environment detection unit is a vibration detection unit that detects vibration of the electronic timepiece, and detects the reception environment based on the amount of vibration detected.

5. The electronic timepiece described in claim 1, further comprising:

a mode changing unit that changes to a timekeeping mode for acquiring the time information using the information acquisition unit, or a positioning mode that acquires the positioning information contained in the satellite signal using the information acquisition unit and calculates the position of the electronic timepiece; wherein when the positioning mode is selected by the mode changing unit, the initial threshold value setting unit sets the initial value of the signal reception threshold value according to the reception environment detected by the reception environment detection unit to a specific first signal reception threshold value for positioning, or to a second signal reception threshold value for positioning that is lower than the first signal reception threshold value for positioning; and when the timekeeping mode is selected by the mode changing unit, the initial threshold value setting unit sets the initial signal reception threshold value to a signal reception threshold value for timekeeping that is lower than the first signal reception threshold value for positioning.

6. The electronic timepiece described in claim 1, further comprising:

a mode changing unit that changes to a timekeeping mode for acquiring the time information using the information acquisition unit, or a positioning mode that acquires the positioning information contained in the satellite signal using the information acquisition unit and calculates the position of the electronic timepiece; wherein when the positioning mode is selected by the mode changing unit, the initial threshold value setting unit sets the initial value of the signal reception threshold value according to the reception environment detected by the reception environment detection unit to a specific first signal reception threshold value for positioning, or to a second signal reception threshold value for positioning that is lower than the first signal reception threshold value for positioning, and the threshold value changing unit lowers the signal reception threshold value according to the search count from the initial signal reception threshold value set by the initial threshold value setting unit; and when the timekeeping mode is selected by the mode changing unit, the initial threshold value setting unit sets a fixed threshold value for timekeeping that is lower than the first signal reception threshold value for positioning as the initial signal reception threshold value, and the threshold value changing unit does not lower the fixed threshold value for timekeeping.

* * * * *